(12) United States Patent
Geese et al.

(10) Patent No.: US 10,412,333 B2
(45) Date of Patent: Sep. 10, 2019

(54) METHOD AND DEVICE FOR SAMPLING AN IMAGE SENSOR

(71) Applicant: Robert Bosch GmbH, Stuttgart (DE)

(72) Inventors: Marc Geese, Ostfildern Kemnat (DE); Ulrich Seger, Leonberg-Warmbronn (DE)

(73) Assignee: Robert Bosch Gmbh, Stuttgart (DE)

(*) Notice: Subject to any disclaimer, the term of this patent is extended or adjusted under 35 U.S.C. 154(b) by 0 days.

(21) Appl. No.: 15/635,877

(22) Filed: Jun. 28, 2017

(65) Prior Publication Data

US 2018/0020178 A1 Jan. 18, 2018

(30) Foreign Application Priority Data

Jul. 13, 2016 (DE) .................. 10 2016 212 791
Sep. 7, 2016 (DE) .................. 10 2016 216 985

(51) Int. Cl.
| | |
|---|---|
| H04N 5/378 | (2011.01) |
| H04N 9/04 | (2006.01) |
| H04N 5/357 | (2011.01) |
| H04N 5/369 | (2011.01) |
| H04N 5/3745 | (2011.01) |

(52) U.S. Cl.
CPC .......... H04N 5/378 (2013.01); H04N 5/3575 (2013.01); H04N 9/045 (2013.01); *H04N 5/3696* (2013.01); *H04N 5/37452* (2013.01)

(58) Field of Classification Search
CPC ....... H04N 5/378; H04N 5/3575; H04N 9/045
See application file for complete search history.

(56) References Cited

U.S. PATENT DOCUMENTS

| | | | |
|---|---|---|---|
| 2009/0268983 A1* | 10/2009 | Stone | H04N 5/23238 382/284 |
| 2010/0171854 A1 | 7/2010 | Yokogawa | |
| 2013/0153748 A1 | 6/2013 | Suzuki et al. | |
| 2014/0118582 A1* | 5/2014 | Artyomov | H04N 9/045 348/242 |
| 2015/0264273 A1* | 9/2015 | Feder | H04N 5/35554 348/239 |
| 2016/0269669 A1* | 9/2016 | Kim | H04N 5/347 |

FOREIGN PATENT DOCUMENTS

| | | |
|---|---|---|
| EP | 1622393 A1 | 2/2006 |
| EP | 2940992 A1 | 11/2015 |

* cited by examiner

*Primary Examiner* — Christopher K Peterson
(74) *Attorney, Agent, or Firm* — Norton Rose Fulbright US LLP; Gerard Messina

(57) ABSTRACT

A method for sampling an image sensor, the image sensor having a lattice structure having a plurality of triangular sensor elements. In the lattice structure, sensor elements situated adjacent to one another are configured to detect light having respectively different light properties. The method includes a step of reading out the image sensor by sampling a plurality of sensor elements of the lattice structure that are configured to detect light in a same first wavelength range, one sensor signal being read out per sensor element in the step of reading out. In addition, the method includes a step of buffering the read-out sensor signals and a step of producing an item of image information assigned to a point of acquisition of the image sensor, using the buffered sensor signals.

17 Claims, 9 Drawing Sheets

METHOD AND DEVICE FOR SAMPLING AN IMAGE SENSOR

RELATED APPLICATION INFORMATION

The present application claims priority to and the benefit of German patent application no. 10 2016 212 791.8, which was filed in Germany on Jul. 13, 2016, and German patent application no. 10 2016 216 985.8, which was filed in Germany on Sep. 7, 2016, the disclosures of both of which are incorporated herein by reference.

FIELD OF THE INVENTION

The present invention relates to a device and a method of the type indicated herein. The subject matter of the present invention is also a computer program.

BACKGROUND INFORMATION

Modern image sensors standardly function according to the following configuration:
1. An optical mechanism produces a light image on a flat sensor (also called an image sensor or imager).
2. The image sensor samples this image spatially and temporally.
3. The temporal sampling is determined by the frame rate.

Here, the standard camera components fulfill the following functions:
The optical mechanism acts as a spatial low-pass filter.
Today, an image sensor is made up of a few million individual light sensors, each light sensor representing a spatial sampling point.
The exposure time acts as a temporal low-pass filter.
For a sampling free of aliasing, the low-pass filter is to be matched to the sampling frequency in such a way that the sampling frequency is twice as great as the cutoff frequency of the low-pass filter (Shannon-Nyquist sampling theorem). In addition, the signal should always run through the low-pass filter before the sampling.

If this does not happen, the sampled signal will contain aliasing artifacts. The spatial aliasing effects are standardly visible at edges having high contrast (as color fringing), point-like objects (by disappearing and reappearing), and objects having a uniform periodic pattern (as a so-called moiré). In the temporal signal, aliasing effects show up as rolling shutter effects (a straight object is imaged as curved), effects such as the "wagon wheel effect" (from a particular speed, a wheel appears to rotate backwards), and problems in the recording of pulsed light sources (LED traffic signals, rear lights of vehicles). Such effects also occur in human vision, and thus show that even here temporal aliasing effects are not completely prevented. For applications in the area of machine vision, the optical flux is an important auxiliary quantity. The quality thereof is significantly improved by a temporally correctly sampled signal.

SUMMARY OF THE INVENTION

Against this background, with the approach presented here a method is presented for sampling a light sensor, as well as a device that uses this method, as well as, finally, a corresponding computer program, according to the main claims. Through the measures indicated in the dependent claims, advantageous developments and improvements of the device as described herein.

A method is presented for sampling an image sensor, the image sensor having a lattice structure having a plurality of triangular sensor elements (light sensors), sensor elements situated adjacent to one another in the lattice structure being configured in order to detect light with regard to properties different from one another, the method including the following steps:
reading out the image sensor by sampling a plurality of sensor elements of the lattice structure that are configured to detect light in a same first wavelength range, one sensor signal being read out per sensor element in the step of reading out;
buffering of the read-out sensor signals; and
producing an item of image information assigned to a point of acquisition of the image sensor, using the buffered sensor signals.

Here, adjacent sensor elements are for example equipped with filters so that these sensor elements produce signals that are assigned to different light properties (e.g. color through different wavelength ranges) or so that a different state of polarization can be recognized. In the step of reading out, sensor elements are sampled that are configured to detect light in a same wavelength range, for example that are configured to recognize blue, green, red, or white light. A point of acquisition of the image sensor can be understood as a region of the image sensor to which the image information is assigned. For example, this point of acquisition can be situated within a region of the image sensor that is situated through an (imaginary) connection of the read-out sensor elements. In this way, an averaging, interpolation, or weighting can be achieved of the individual read-out or buffered sensor signals, in order in this way to enable a reconstruction at a point on the image sensor. The configuration on a lattice having a triangular elementary cell is particularly advantageous if four different image sensor types are used, for example red, green, blue, and white, or any other combination of four different image sensor types (possible image sensor types: R, G, B, yellow, magenta, white, log scale white, polarization directions, etc.)

In an advantageous specific embodiment of the approach proposed here, in the step of reading out at least three sensor elements are sampled, such that of three sampled sensor elements two are situated on a sensor element straight line and at least one third sensor element is not situated on the sensor element straight line. Such a specific embodiment of the approach proposed here offers the advantage that sensor elements are read out that cover a spatially large area and thus enable an optimization of the spatial resolution.

In particular, according to a specific embodiment, in the step of reading out a sensor element can be sampled, as the sensor element to be read out that is not situated on the sensor element straight line, that is situated at a position in the lattice structure such that at least one sensor element is situated between the position and the sensor element straight line. Such a specific embodiment of the approach proposed here offers the advantage of sampling sensor elements that are positioned in a regular geometric configuration, and are nonetheless situated far enough from one another that in this way a spatial resolution of an image signal can be improved.

According to a further specific embodiment of the approach proposed here, in order to improve a temporal resolution of the image acquisition using the image sensor named above, in the step of reading out the sensor elements can be read out at different time intervals, the time intervals overlapping at least partially. In this way, the problems related to maintaining the Nyquist criterion in the operation of the image sensor can advantageously be completely avoided, or at least significantly improved.

An improvement related to maintaining the Nyquist criterion during the operation of the image sensor is also offered by a specific embodiment of the approach proposed here in which the step of producing takes place using an interpolation of the buffered sensor signals and/or of signals derived from the buffered sensor signals.

The specific embodiments named above relate to the processing of sensor signals by sensor elements configured for the acquisition of the same type of light properties. However, particularly advantageous is a specific embodiment of the approach proposed here in which not only sensor signals of sensor elements are processed that have an identical light wavelength, but also the approach proposed here is used for a plurality of groups of sensor elements that are configured each to acquire different wavelength ranges of the light. Correspondingly advantageous is a specific embodiment of the approach proposed here in which the steps of reading out, buffering, and producing are repeated for sensor elements that are configured to detect light in a same second wavelength range differing from the first wavelength range.

Further advantageous is a specific embodiment of the approach proposed here in which the steps of reading out, buffering, and producing are carried out multiple times cyclically in succession, such that in a first cycle sensor elements are read out that are situated in the lattice structure on a common first sensor element straight line and at a position in the lattice structure such that at least one sensor element is situated between the position and the sensor element straight line, and in a second cycle sensor elements are read out that are situated in the lattice structure on a common second sensor element straight line differing from the first sensor element straight line, and at a position in the lattice structure such that at least one sensor element is situated between the position and the second sensor element straight line. Such a specific embodiment of the approach proposed here offers the advantage of reading out sensor elements in the different cycles at different positions of the image sensor and/or at different times, and in this way to bring about an optimization in the area of the temporal and spatial sampling or the prevention or at least reduction of aliasing effects. Here, the sensor straight line can be realized arbitrarily in the symmetry of the structure determined by the triangular elementary cell. Thus, rotations by 60° of the sensor configurations are advantageous, depending on the boundary conditions of the embodiment.

According to a further specific embodiment, in the step of buffering a weighting of one or more of the sensor signals takes place. Such a specific embodiment of the approach proposed here offers the advantage of producing an improved signal-to-noise ratio, and for example also enabling an adaptation of pulse lengths corresponding to a low-pass characteristic.

The methods presented here, or variants thereof, can for example be implemented in software or in hardware, or in a mixed form of software and hardware, for example in a control device or in a corresponding device.

The approach presented here thus creates a device that is configured to carry out, control, or realize the steps of a variant of a method presented here in corresponding devices. Through this variant embodiment of the present invention in the form of a device as well, the object of the present invention can be achieved quickly and efficiently.

For this purpose, the device can have at least one computing unit for processing signals or data, at least one storage unit for storing data, at least one interface to a sensor or to an actuator for reading in sensor signals from the sensor or for outputting data or control signals to the actuator, and/or at least one communication interface for reading in or outputting data that are embedded in a communication protocol. The computing unit can for example be a signal processor, a microcontroller, or the like, and the storage unit can be a flash memory, an EEPROM, or a magnetic storage unit. The communication interface can be configured to read in or output data in wireless and/or wire-bound fashion, and a communication interface that can read in or output wire-bound data can read in these data from a corresponding data transmission line or output them to a corresponding data transmission line for example electrically or optically.

In the present context, a device can be understood as an electrical device that processes sensor signals and outputs control and/or data signals as a function thereof. The device can have an interface that can be configured as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules present on a microcontroller alongside other software modules.

In an advantageous embodiment, through the device there takes place an evaluation of an image sensor, for example for a vehicle camera for recognizing a surrounding environment of the vehicle. For this purpose, the device can for example acquire sensor signals such as the signals of the image sensor or of the camera, and can correspondingly process these signals. The controlling or processing of the sensor signals takes place using for example a semiconductor module on which the image sensor is also made or integrated, for example in a different plane of this semiconductor module.

Also advantageous is a computer program product or computer program having program code that can be stored on a machine-readable bearer or storage medium such as a semiconductor memory, a hard drive memory, or an optical memory, and is used to carry out, realize, and/or control the steps of the method according to one of the specific embodiments described above, in particular when the program product or program is executed on a computer or on a device.

Exemplary embodiments of the approach presented here are shown in the drawings and are explained in more detail in the following description.

DETAILED DESCRIPTION

In the following description of advantageous exemplary embodiments of the present invention, identical or similar reference characters are used for elements shown in the various Figures having similar function, and repeated description of these elements is omitted.

For the understanding of the approach proposed here, first the functioning of image sensors is again discussed. The current functioning of image sensors produces a relatively short exposure time compared to the resulting frame rate. The exposure time acts as a low-pass filter that can be regarded in idealized form as a rectangle in the time domain. In the frequency space, the rectangular low-pass filter having broad $t_{exp}$ is represented as an si function:

$$rect\left(\frac{t}{t_{exp.}}\right) \circ\!\!-\!\!si(\pi f t_{exp.}) \quad (1)$$

The first zero crossing of the si curve is at:

$$\pi f t_{exp.} = \pi \quad (2)$$

$$f_{cutoff} = \frac{1}{t_{exp.}} \quad (3)$$

and is at the same time a standard approximation of the cutoff frequency of the low-pass filter. If we compare standard exposure times of $$t_{exp.} \approx 500 \ \mu s \quad (4)$$

with standard image refresh rates/sampling frequencies of:

$$t_{frame} \approx \frac{1}{30} \approx 33 \ ms \quad (5)$$

then sampling frequency $f_{sample}$ and low-pass filter cutoff frequency $f_{Nyq}$ result as:

$$f_{sample} = 30 \quad (6)$$

$$f_{Nyq.} = \frac{1}{0.5 \cdot 10^{-3}} = 2 \cdot 10^3 \quad (7)$$

However, according to the sampling theorem, the following should hold:

$$f_{cutoff} \approx f_{Nyq.} \quad (8)$$

$$f_{Nyq.} \leq \frac{1}{2} f_{sample} \quad (9)$$

$$\Rightarrow \text{setpoint} \ \frac{f_{Nyq.}}{f_{sample}} \leq \frac{1}{2} \quad (10)$$

$$\Rightarrow \text{actual:} \ \frac{f_{Nyq.}}{f_{sample}} \leq \frac{2}{3} \cdot 10^2 \quad (11)$$

Figure 1:
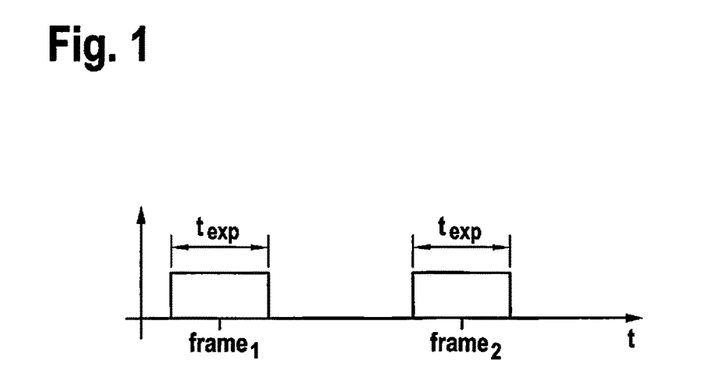
FIG. 1 shows a diagram in which a sampling function takes place with a window function of the temporal window width.

FIG. 1 shows a diagram in which a sampling function takes place with a window function having temporal window width $t_{exp}$ at times frame 1 and frame 2, which can be regarded as a currently standard sampling schema. This clearly violates the Nyquist theorem. This is not a problem as long as high frequencies do not occur in the world (slowly moving clouds, photography, etc.).

In the area of driver assistance systems, however, rapid changes in the scene, in particular in standard use cases, are particularly important, for example in the calculation of an optical flux at pedestrian extremities, or in the detection of LED lights (brake lights, variable message signs). For this reason, it would be good also to correctly temporally sample the light signal or to be alerted when there is a violation of the sampling theorem.

As regards problems of the current temporal sampling, for a temporally correct sampling it would be necessary to satisfy equation (12):

$$\frac{f_{Nyq.}}{f_{sample}} \leq \frac{1}{2} \quad (12)$$

However, the following criterion also results from this:

$$2 f_{Nyq.} \leq f_{sample} \quad (13)$$

$$\Rightarrow 2 \frac{1}{t_{exp.}} \leq \frac{1}{t_{frame}} \quad (14)$$

$$\Rightarrow t_{exp.} \geq 2 t_{frame}. \quad (15)$$

This means that the exposure time for a correct sampling should last twice as long as a standard frame. In addition, for a better low-pass characteristic, another temporally adapted signal adaptation, for example in the manner of a multiplication with a temporally varying factor, would be required.

Figure 2:
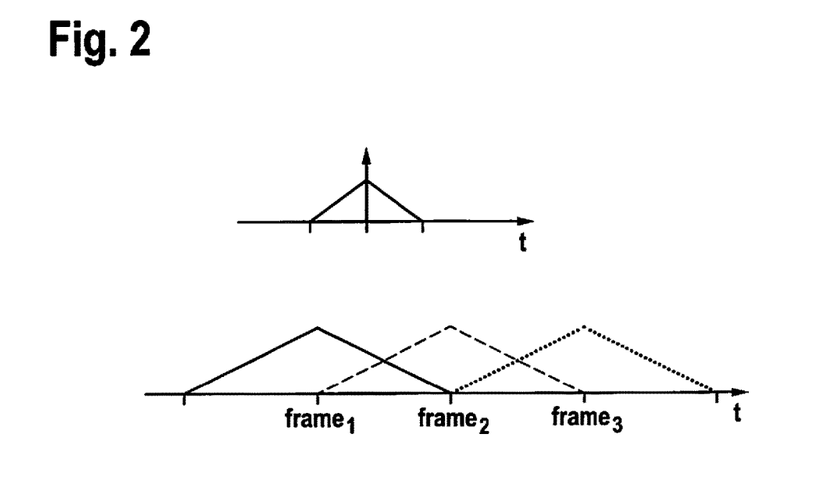
FIG. 2 shows a plurality of sub-diagrams showing a Nyquist-conforming sampling schema.

FIG. 2 shows a plurality of sub-diagrams in which a Nyquist-conforming sampling schema is shown. In the upper sub-diagram, a schematic target low-pass characteristic over time t is shown, whereas in the lower sub-diagram an exposure schema is shown that shows an ideal temporal sampling with corresponding overlapping low-pass filters, here as temporal modulation at times frame 1, frame 2, and frame 3, with a triangle function.

In the Nyquist-conforming case, the actual frame rate is determined by the width of the low-pass filter. For standard image sensors, a longer integration time than 1 ms during the day is however possible only with difficulty (boundary conditions such as SNR, night-capable design, etc.). As a result, given a temporally correct sampling the frame rate also increases significantly (>1 kHz would be necessary).

These high data rates cannot be processed, and should therefore be calculated ahead of time back down to the standard 30 Hz. However, this can take place for example through downstream signal processing.

Here, however, correct downsampling again requires a low-pass filter followed by sampling with the desired frame rate. Because the output signal does not contain any aliasing effects, the final signal, with reduced frame rate and given correct downsampling, will also not contain any aliasing.

Thus, in the temporal sampling of the light signal a temporal low-pass filter is used. This is determined on the one hand by the exposure time. The fact that the standard frame rates and exposure times are not sufficient for this is designated in the spatial sampling by the term standard sampling. While spatially the unsharpness of the optics ensures that the signal is low-pass filtered beyond the pixel dimension, the counterpart is often missing for the temporal dimension.

Here, in principle there are two possibilities for realizing a temporally correct sampling.

Temporal offset as spatial realization in the pixel plane.
Pixel design possibilities for realizing the temporal low-pass filter.

According to the above statements, at each spatial sampling point, but at the temporal recording times, the light signals can be differently weighted and then integrated in order to achieve a temporally correct sampling. The temporally different weighting here is represented for example by the characteristic of the low-pass filter.

The temporally different weighting and/or measurement value generation is/are here for example to be realized such that the continuous light signal at each time always influences at least two or more of the generated temporal sampling measurement values.

Through the overlapping of the temporal sampling, two or more storage units are now actually required for spatial sampling time pixels. These storage units can in most cases be realized by electronic capacitors.

As explanation, it can be stated that for example the second sampling time already begins to integrate while the first sampling time has not yet finished its temporal integration.

When the first frame is concluded, the third frame begins with its integration, etc. Because the measurement values of the first frame also require a finite readout time, in practice not only two, but rather three storage units are probably required.

The realization of the temporally overlapping sampling values is explained in more detail below.

In the spatial reconstruction, a calculation should take place from a plurality, advantageously at least three, image sensor measurement values in order to reconstruct the continuous light signal for a 2-D spatial point.

If the post-processing is configured with an adequate outlay (for example in a signal generation block), then from the signal of the three storage units it is now possible to reconstruct the signal at an arbitrary desired time between the first and last time. The target frame rate can ultimately be reached through successive carrying out, and/or expansion, of these reconstruction steps. Here, however, correct downsampling again requires a low-pass filter followed by a sampling with the desired frame rate. Because the output signal does not contain any aliasing effects, given correct downsampling the final signal with reduced frame rate will also contain no aliasing.

However, it can happen that the image signal calculated down to a low frame rate also contains less edge sharpness in the spatial dimensions than is the case at a high frame rate. This results in particular from the fact that an aliasing-free reduction of the frame rate, given a realization according to the existing art, causes a longer virtual exposure time, resulting in mixing of the image signals in this region. This can be counteracted by using a spatial-temporal filter for the calculation of the image signal. This filter can be arbitrarily complex and can have, inter alia, the following characteristics:

limitation of the input parameters taken into account to measurement values from a limited neighborhood (e.g. direct or overdirect neighborhood)

limitation of the input parameters taken into account to measurement values of a limited time window (e.g. only the last five temporal measurement values)

calculation of the input values as a function of their local position calculation of the input values as a function of the time of their recording calculation of the input values using nonlinear operations (min, max, median)

calculation of the input values using linear operators (convolutions, multiplications, and additions)

calculation of the input values explicitly taking into account spatial and temporal relationships calculation of the input values taken into account various modeling assumptions here including in particular: taking into account models for spatial/temporal localization of pulse width-modulated light sources having the degrees of freedom: repeat rate, duty cycle, and phase position to the current frame rate, such as LEDs of variable message signs and rear lights in automobiles.

In addition, the signal generation block can also calculate further signal features, such as:

the possibility of calculating and outputting the average temporal and/or spatial (local) change in the signal between two times (this can lead to a reduction of the data rate).

from the individual exposures Frame 1-3, it can also be calculated how great the temporal and/or spatial (local) variance of the signal is from the above-named intermediate measurement values, features having few bits of information contact can be extracted by applying parameterizable threshold values.

in particular, one or more threshold value formations can be used to mark a spatial-temporal signal volume as "flickering/pulsed LED" (e.g. by evaluating the temporal signal variance relative to the temporal mean value).

The following example can be given here as explanation: if the signal of a sensor element deviates in a sampling period by more than 25%, the signal can be marked as fluctuating with a marker bit, which can be helpful for the detection of artificial light sources. The threshold should be capable of being adapted in an appropriate manner temporally and, if warranted, also with regard to location.

In addition to temporal alias-free sampling, there are other examples of applications that can be performed in the post-processing unit:

extraction of a precise depth estimation with structured illumination through evaluation of a spatial temporal signal volume.

Determination of temporal characteristics (frequency, duty cycle, etc.) from different light sources.

The invention presented here is described in more detail in its design and function in the following on the basis of a detailed exemplary embodiment with possible alternatives.

An aspect of the approach presented here is to transfer the temporally overlapping integration times into the spatial dimension, while here making use of a regular sampling grid with approximately triangular image sensors or sensor elements. Here the fact is exploited that a triangle is inherently the minimum two-dimensional shape that permits a correct interpolation on a two-dimensional surface.

Figure 3:
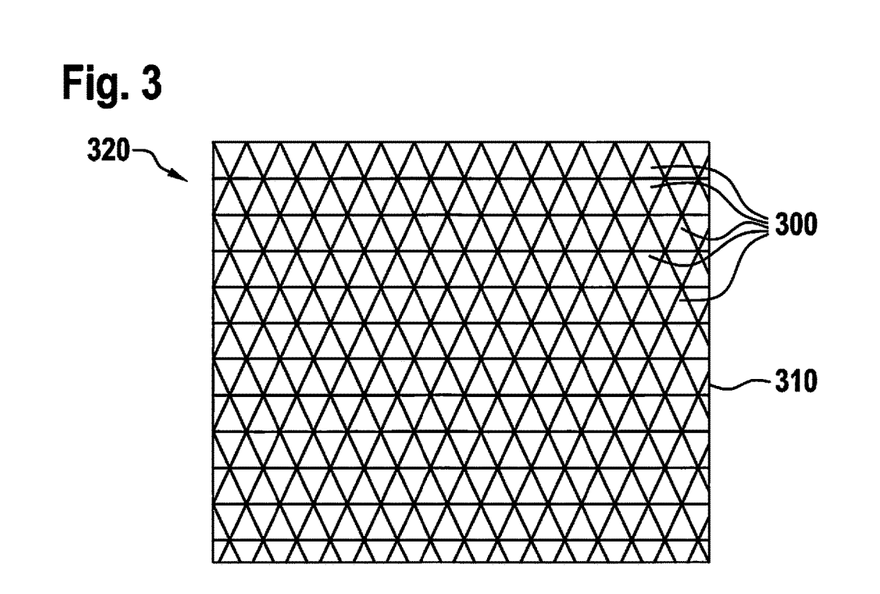
FIG. 3 shows a possible configuration of sensor elements in a lattice structure.

FIG. 3 shows a possible configuration of sensor elements 300 (which can also be designated pixels) in a lattice structure 310. Each of these sensor elements 300 is configured as a triangular sensor element 300 of image sensor 320, and each of the sensor elements is equipped for example with a spectral filter for the colors blue, green, red, or clear/white/broadband, and is thus capable of detecting light in a prespecified wavelength range.

Figure 4:
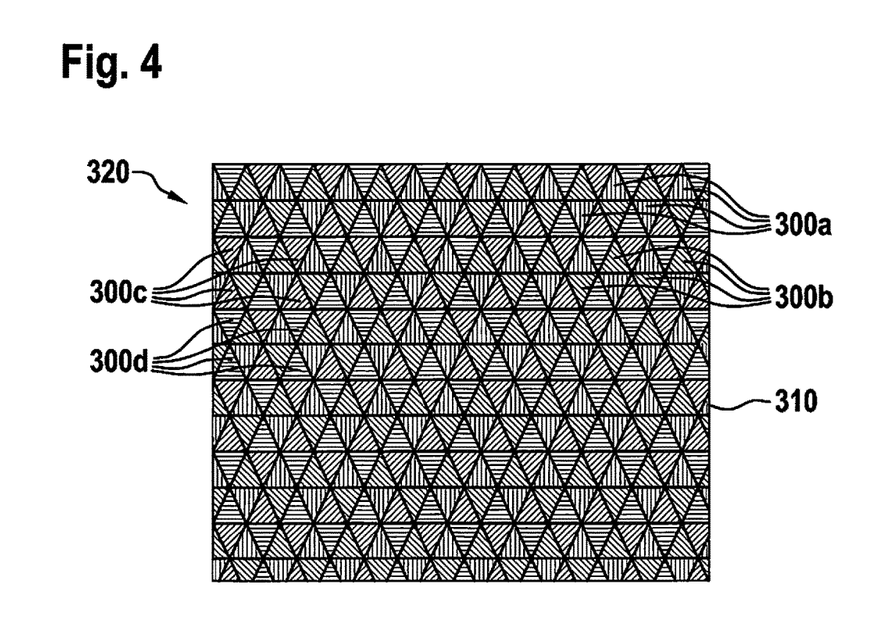
FIG. 4 shows a regular configuration of triangular sensor elements of the image sensor in a quadruple channel.

FIG. 4 shows a regular configuration of triangular sensor elements 300 of image sensor 320 in a quadruple channel, each of these channels containing sensor elements 300 that are configured each to acquire one of the above-named four colors blue, green, red, and white. In addition, from FIG. 4 it can be seen that sensor elements that are configured adjacent to one another (relative to a side edge of the sensor elements) are configured for the detection of light of a respectively different wavelength or different wavelength range. This is shown in FIG. 4 by the different hatching of the sensor elements 300 configured in lattice structure 310. For example, sensor elements 300a are configured to detect blue light, sensor elements 300b are configured to detect green light, sensor elements 300c are configured to detect red light, and sensor elements 300d are configured to detect white light.

Thus, according to the exemplary embodiment of the present invention described here, a four-channel color filter image sensor 320 is used in which sensor elements 300 are configured as triangular pixels and are configured in a regular lattice structure 310. For the interpolation of a multidimensional light signal (on this, see the procedure described in more detail below with reference to the signal generation block), different neighborhoods of sensor elements 300 can now be used.

Figure 5:
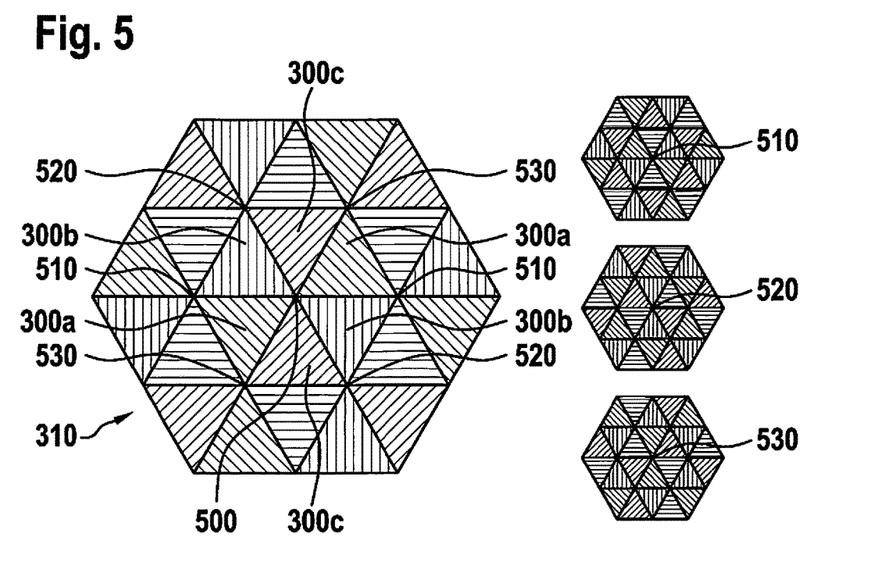
FIG. 5 shows a detailed view of sensor elements situated adjacent to one another for the detection of light in different wavelength ranges.

FIG. 5 shows a detailed representation of sensor elements 300 situated adjacent to one another for the detection of light of different wavelength ranges, for a selection of possible neighborhoods of sensor elements 300. In the representation at left in FIG. 5 there is shown a lattice structure 310 in which a point of acquisition 500 is shown that adjoins upper sensor element 300c, which is sensitive to red light, and at top right and lower left adjoins a sensor element 300a sensitive to blue light, and at top left and lower right adjoins a sensor element 300b sensitive to green light. Analogously, corresponding adjacent sensor elements 300 sensitive to differently colored light are also adjacent to further acquisition points 510, situated at left and at right next to acquisition point 500, and for acquisition points 520 at top left and at lower right of acquisition point 500, corresponding adjacent sensor elements 300 sensitive to differently colored light are likewise adjacent. The same holds analogously for acquisition points 530 at lower left and top right relative to acquisition point 500. In the depiction shown at right in FIG. 5, the corresponding patterns are shown of the sensor elements sensitive to different wavelength ranges, which concern the corresponding acquisition points 510 to 530.

In these neighborhoods, interpolation can now take place with different triangles to the center point as point of acquisition.

Figure 6:
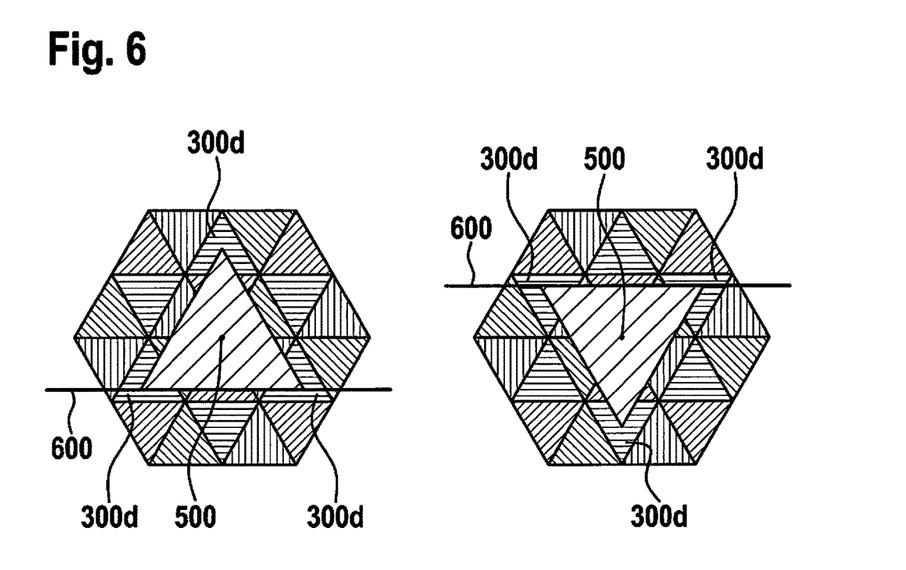
FIG. 6 shows an exemplary embodiment in which the interpolation possibility is presented for an item of image information relating to white light from the sensor elements in a four-channel CFA.

FIG. 6 shows an exemplary embodiment presenting the possibility of interpolation for an item of image information relating to white light from sensor elements 300d. Here, the sensor signals of the for example three sensor elements 300d can be used, which are situated most closely around point of acquisition 500. These would be on the one hand sensor elements 300d, shown in the left sub-representation of FIG. 6, in a sensor element straight line 600 below point of acquisition 500, as well as a sensor element 300b above point of acquisition 500, a further sensor element 300c being situated between point of acquisition 500 and sensor element 300d for white light. In FIG. 6, in the right sub-representation, an alternative selection of sensor elements 300d is shown whose sensor signals can be used for the interpolation or ascertaining of the image content for point of acquisition 500. Here it will be seen that point of acquisition 500 is always situated inside an (imaginary) region that is formed by connecting those sensor elements 300d whose sensor signals are to be used to ascertain the image content.

Figure 7:
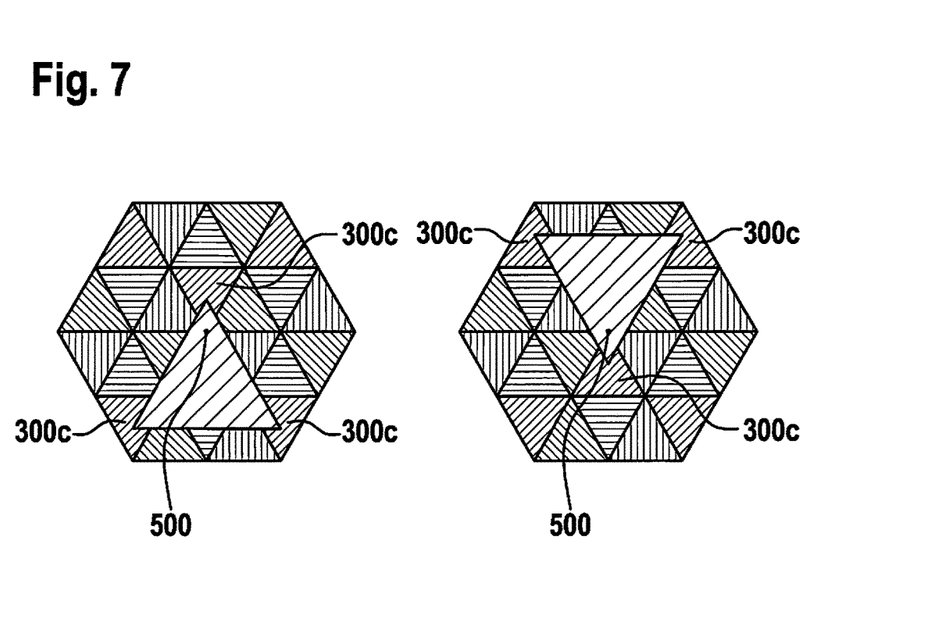
FIG. 7 shows an exemplary embodiment in which the interpolation possibility is presented for an item of image information relating to red light from the sensor elements in a four-channel CFA.

FIG. 7 shows an analogous possibility for selecting sensor elements 300c, here sensitive to red light, so that a corresponding item of information can likewise be ascertained for point of acquisition 500 via an image processing or interpolation.

Figure 8:
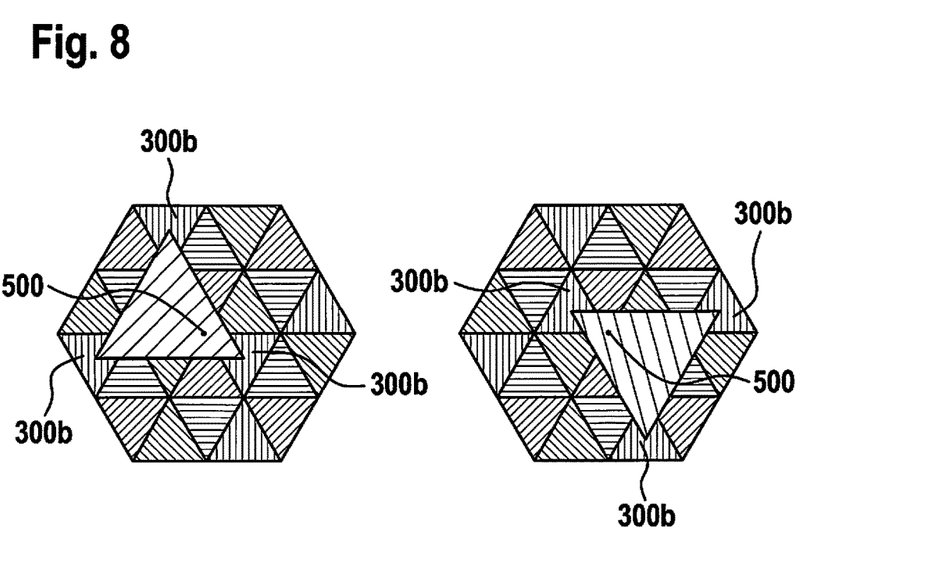
FIG. 8 shows an exemplary embodiment in which the interpolation possibility is presented for an item of image information relating to green light from the sensor elements in a four-channel CFA.

FIG. 8 shows an analogous possibility for selecting sensor elements 300b, here sensitive to green light, so that a corresponding item of information can be ascertained for point of acquisition 500 via an image processing or interpolation.

Figure 9:
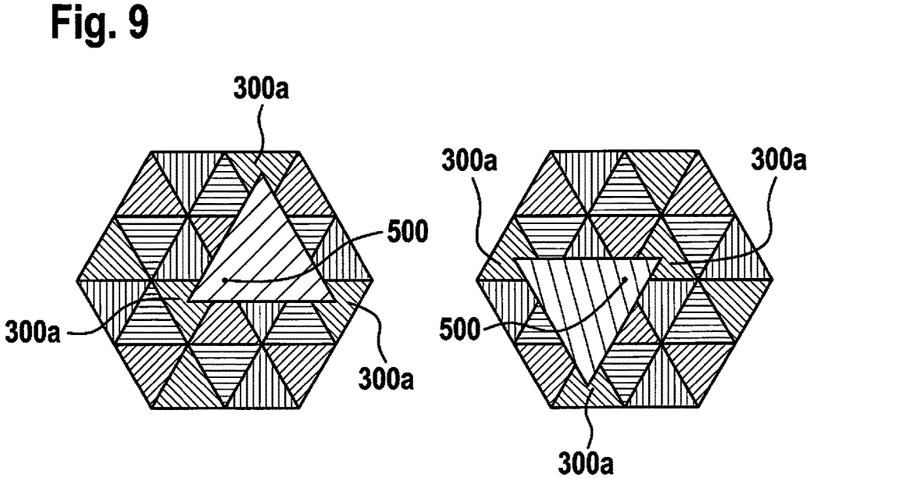
FIG. 9 shows an exemplary embodiment in which the interpolation possibility is presented for an item of image information relating to blue light from the sensor elements in a four-channel CFA.

FIG. 9 shows an analogous possibility for selecting sensor elements 300a, here sensitive to blue light, so that a corresponding item of information can be ascertained for point of acquisition 500 via an image processing or interpolation.

From the description relating to FIGS. 6 through 9, it is clear that an item of image information, for example a brightness, color, or some other image parameter for a point of acquisition 500 of image sensor 320 can be realized using the methods presented here by dividing the image sensors or sensor elements 300 on the sensor surface of image sensor 320 into a plurality of groups. Each of these groups then corresponds to a phase-shifted sampling lattice in the spatial representation (as described above). Each of these sampling lattices can for example also be controlled separately with a temporal phase offset to the other lattices.

The above-proposed triangular configuration enables, in particular given a four-channel color filter array, the possibility of realizing two phases and the simultaneous possibility of always distinctly having three sensor elements 300 of the same sort (i.e. sensitive for light of the same wavelength range) available for interpolation.

Figure 10:
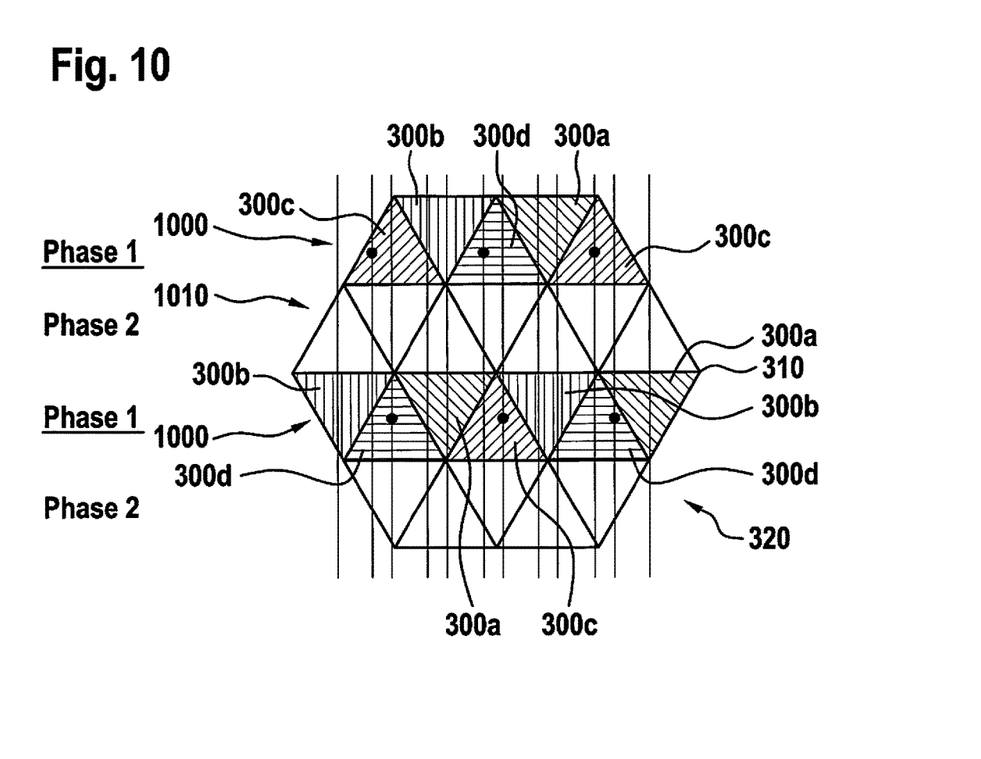
FIG. 10 shows a schematic pattern of how the sensor elements can be read out.

FIG. 10 shows a schematic pattern of how sensor elements 300 can be read out and how the corresponding sensor signals therefrom can be processed. For such an evaluation of the sensor signals of sensor elements 300 of light sensor 320, the reading out can take place in two phases. In a first phase 1, two lines 1000 of sensor elements 300 are formed having sensor elements 300 that have sensitivity for different wavelengths, the sensor elements 300 of these lines 100 being configured with a spacing such that a further line 1010 of sensor elements 300 is situated between the two lines 1000. This further line can then be read out in a second phase 2, or a second cycle, as is explained in more detail below.

In the first phase 1, for example sensor elements 300b of the two lines 1000, sensitive to green light, are now for example read out. The sensor signals, which represent values of the individual sensor elements 300b sensitive to green light, can then be buffered in a respective storage cell and, if warranted, preprocessed before these buffered or preprocessed sensor signals are used to produce an item of image information that is then assigned to an acquisition point that is situated within the (imaginary) connecting line of the read-out sensor elements 300b. Subsequently, or temporally parallel thereto, sensor elements 300c of the two lines 1000 can also be read out, which are sensitive to red light. The sensor signals that represent the values of the individual sensor elements 300c sensitive to red light can then be buffered in a respective storage cell and, if warranted, preprocessed before these buffered or preprocessed sensor signals are used to produce an item of image information that is then assigned to a point of acquisition that is situated within the (imaginary) connecting line of the read-out sensor elements 300c. Likewise subsequently or temporally parallel thereto, sensor elements 300d of the two lines 1000 can also be read out, which are sensitive to white light. The sensor signals that represent the values of the individual sensor elements 300d sensitive to white light can then be buffered in a respective storage cell and, if warranted, preprocessed before these buffered or preprocessed sensor signals are used to produce an item of image information that is then assigned to a point of acquisition that is situated within the (imaginary) connecting line of the read-out sensor elements 300d. Analogously subsequently or temporally parallel thereto, sensor elements 300a of the two lines 1000 can also be read out, which are sensitive to blue light. The sensor signals that represent the values of the individual sensor elements 300a sensitive to blue light can then be buffered in a respective storage cell and, if warranted, preprocessed before these buffered or preprocessed sensor signals are used to produce an item of image information that is then assigned to a point of acquisition that is situated within the (imaginary) connecting line of the read-out sensor elements 300a.

Figure 11:
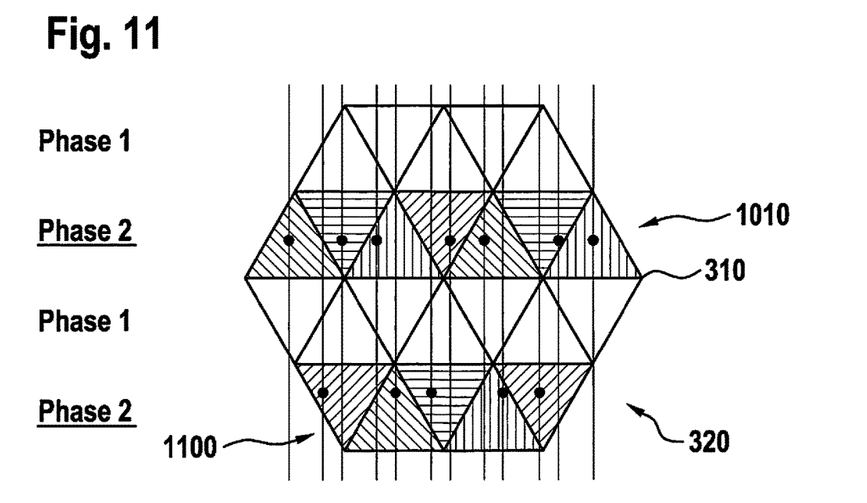
FIG. 11 shows a further schematic pattern of how the sensor elements can be read out.

FIG. 11 shows a further schematic pattern of how the sensor elements can be read out. Analogously, in the second phase 2, or in the second cycle, sensor elements 300, here of further line 1010 or of a corresponding additional line 1100, can now be read out, sensor elements 300 of additional line 1100 likewise again being situated at a distance from a sensor element 300, i.e. one of the lines 1000 is situated between further line 1010 and additional line 1100. Based on the neighborhood of sensor elements 300 each having different sensitivity for different wavelength ranges, in the second cycle, or the second phase, sensor elements 300a sensitive to blue light are now read out in a manner analogous to the procedure described above with reference to FIG. 10, the sensor signals obtained therefrom are buffered or pre-processed, and in turn a corresponding item of image information for a point of acquisition is produced therefrom. The analogous procedure is now also carried out for sensor elements 300d sensitive to white light, for sensor elements 300c sensitive to red light, and for sensor elements 300b sensitive to green light, so that here likewise corresponding image information or image contents are produced for an associated point of acquisition. In addition, it can be seen that through the use of the line-by-line configuration of sensor elements 300 that are to be read out, again two of the read-out sensor elements 300 are situated on a common sensor element straight line, as was described above with reference to FIG. 6.

From a signal-theoretical point of view, the procedure presented here has some special characteristics. The produced light or sensor element signals standardly represent a number of electrons collected in a capacitor. The signals of overlapping exposure times now have to be offset with one another in order to obtain an aliasing-free signal (for example as image information). In addition, the spatial structure of the given design and the characteristic of the temporal low-pass filter also have to be taken into account. Mathematically, the optical low-pass filter with the temporal low-pass filter represents a unit for describing the low-pass filtering of the spatial-temporal light signal. This is to be taken into account in the realization of the later signal reconstruction.

If the image sensors are read out, as is standard today, with a constant temporally offset exposure time, then the low-pass filter is a sinc function in the frequency domain. Ideal would be a rectangular filter in the frequency domain, which requires a sinc modulation in the time domain.

Practically speaking, here there is a set of tested and state-of-the-art alternatives relating to the realizations of the low-pass characteristic, e.g. a Lanczos filter, a mixture of triangle and sinc filters, etc.

Figure 12:
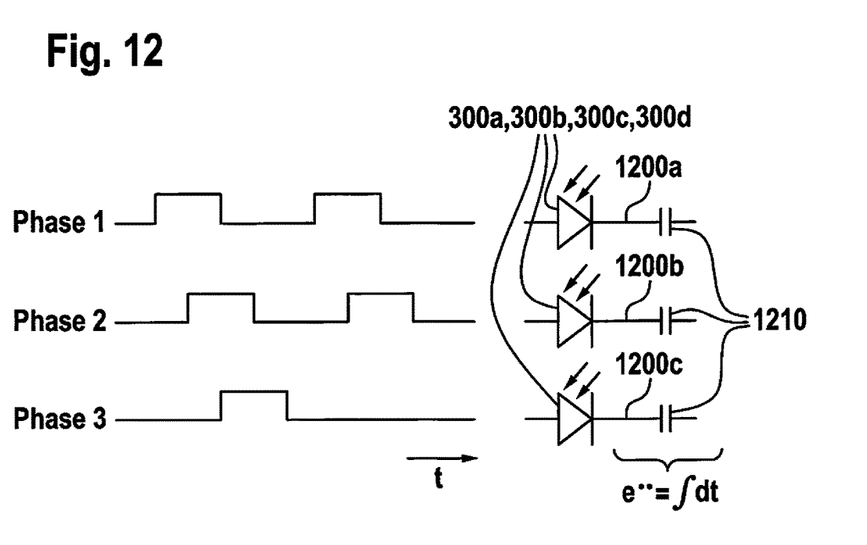
FIG. 12 shows a diagram in which an example of a realization of the equally weighted integration in the reading out of a plurality of sensor elements named above is described.

FIG. 12 shows a diagram describing an exemplary embodiment of the equally weighted integration in the reading out of a plurality of sensor elements 300 named above. Here, the respectively read-out sensor elements 300a, 300b, 300c, 300d (here realized as photodiodes) are respectively sensitive for the same wavelength range (i.e. for red-sensitive sensor elements, blue-sensitive elements, white-sensitive sensor elements, or green-sensitive sensor elements). Here the reading out takes place in each case for those time intervals in which the curve assigned to the relevant pixel has a high level. This means that each of the three sensor elements 300a, 300b, 300c, 300d that are to be read out corresponding to the procedure described above (which are shown in FIG. 12 with Pixel 1, Pixel 2, and Pixel 3 for better distinguishability) are read out temporally one after the other, advantageously in at least partly temporally overlapping fashion, the read-out value, or the corresponding sensor signal 1200a, 1200b, 1200c of sensor elements 300a, 300b, 300c, 300d being buffered in a respective capacitor 1200 in which there takes place an integration of the electrons in this capacitor 1210 over time.

Figure 13:
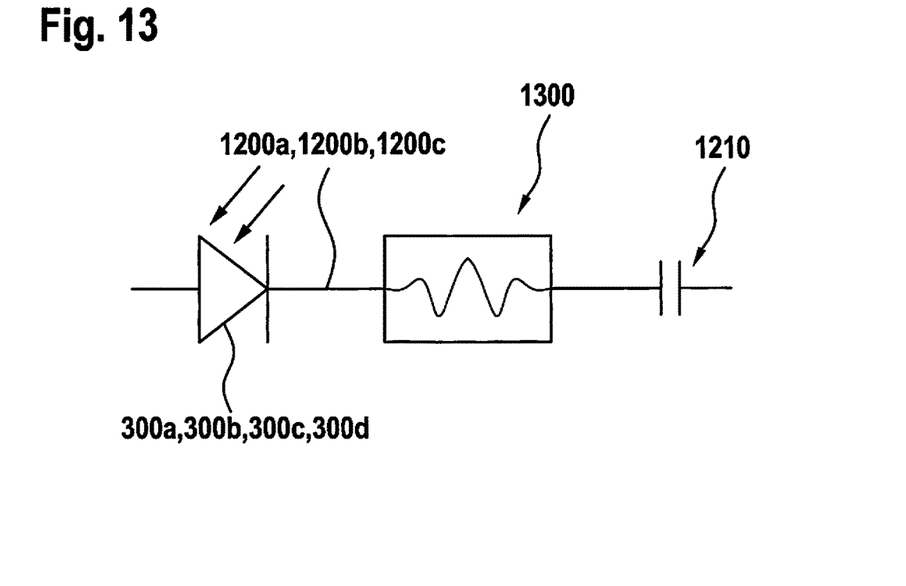
FIG. 13 shows a schematic circuit diagram having a parameterizable low-pass modulator.

In addition, the procedure presented here also enables a parameterizability of the time-continuous low-pass filter. A possibility for realizing a parameterizable temporal low-pass filter supplies the time-continuous photodiode signal to a low-pass modulator 1300. FIG. 13 shows a schematic circuit system having such a parameterizable low-pass modulator 1300. This modulator produces, from the sensor signal 1200a, 1200b, 1200c resulting from the relevant photodiode as sensor element 300*a*, 300*b*, 300*c*, 300*d*, a temporally modulated current that is integrated in a capacitance, or capacitor 1210, and from there is supplied to the post-processing, or to the local-temporal light signal reconstruction.

Figure 14:
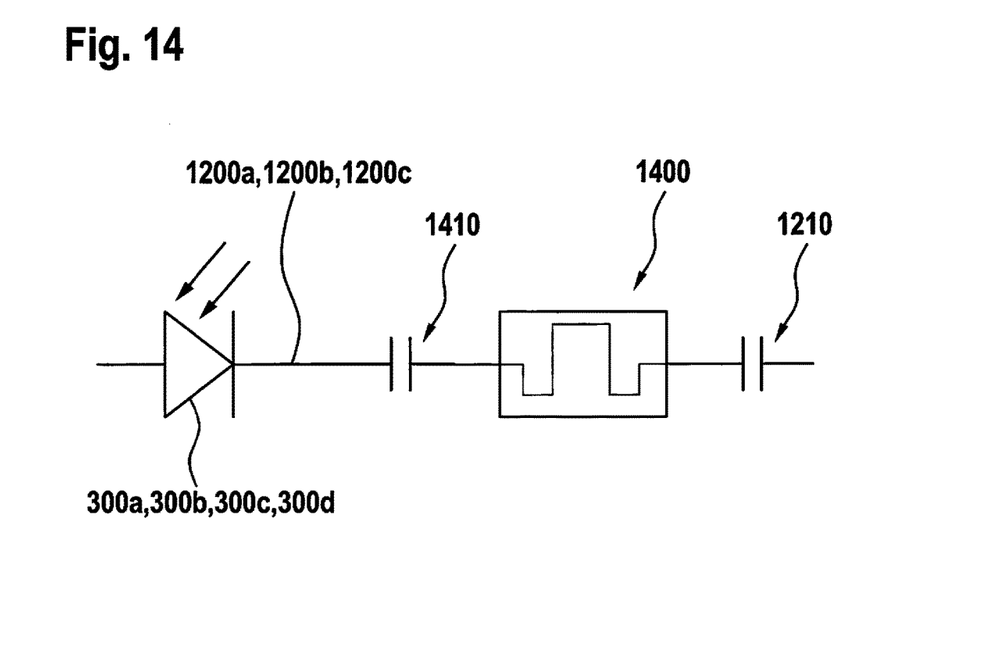
FIG. 14 shows a schematic circuit diagram having a parameterizable time-discrete low-pass filter.

With the approach presented here, the realization is enabled of a parameterizable time-discrete low-pass filter, as shown schematically in FIG. 14 as an example for a weighted time-discrete integration or pulsed exposure time. A possibility for realizing a parameterizable temporal low-pass filter can be realized through the temporal discretization of the diode signal or sensor signal 1200*a*. For this purpose, photodiode 300*a*, 300*b*, 300*c*, 300*d* is read out for example several hundred times in the low-pass time span.

However, in this exemplary embodiment of the present invention the collected electrons are first amplified, corresponding to the temporally current weight of the low-pass filter, which can take place for example in a suitable time-dependent multiplier 1400; the multiplication carried out in this multiplier 1400 can also be negative. This modulation can take place for example through buffering in a small capacitor 1410 with subsequent amplification and back-conversion into a current that is stored in capacitor 1210. The generated signal 1200*a*, 1200*b*, 1200*c* is thus weighted per pulse and supplied to the storage capacitor, where it is integrated. In addition, in this design the pulse lengths can also be adapted corresponding to the low-pass characteristic in order to produce an improved signal quality.

Figure 15:
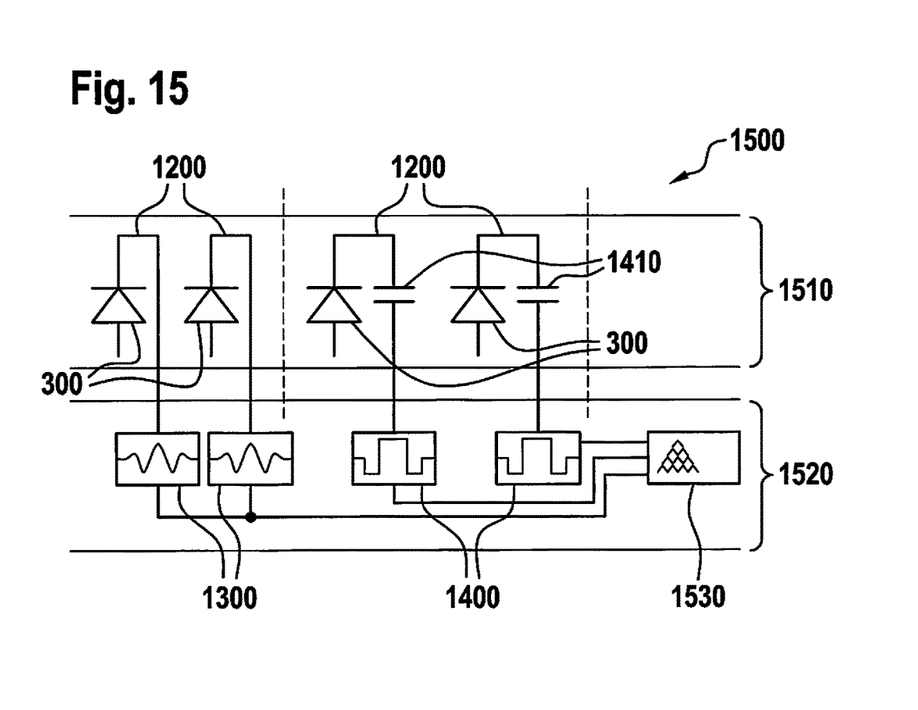
FIG. 15 shows a schematic cross-sectional view of a module for implementing the approach presented here.

Particularly advantageously, the approach presented here can be used when the individual components for carrying out the method presented here are integrated on a common processing module 1500. In this way, a construction of the pixel structure in a so-called stacked die can take place. Classical semiconductor processes realize their circuits in a two-dimensional design alongside one another. However, modern semiconductor processes are capable of placing multiple circuits one over the other and connecting them. This is referred to as stacked die technology. For the case of temporally correct sampling, as mentioned above, more complex hardware structures are necessary than are provided in current image sensors. Therefore, according to a particularly advantageous exemplary embodiment, it is proposed to leave the photon-to-electron conversion in an upper layer of a correspondingly configured module (as is standard today) and to situate the low-pass modulation and the further post-processing steps that may be carried out (gradient formation, signal reconstruction at the frame time, etc.) in a lower layer of the module.

FIG. 15 shows a schematic cross-sectional view of such a module 1500. In upper layer 1510 there takes place the photon-electron conversion, either without pre-storing sensor signals 1200 from sensor elements 300 or, if warranted, with pre-storing sensor signals 1200 from sensor elements 300 in small capacitor 1410, if a time-discrete integration is provided. In the module under layer 1510 relevant for the photon-electron conversion, a signal processing plane 1520 is then provided. This lower plane 1520, or layer, can then also be produced in a different manufacturing technology (e.g.: 14 nm or 7 nm) than the layer for the photon-electron conversion, thereby enabling significantly more complex standard signal preparation steps. In this signal processing plane 1520, low-pass modulators 1300 and/or multipliers 1400 can then for example be formed in order to enable execution of a corresponding processing of sensor signals 1200 or of the signals originating from small capacitors 1410. Finally, a more complex signal processing unit 1530 can also be provided in the signal processing plane, in which the step or steps of production can for example be carried out.

In sum, it is to be noted that according to a particularly advantageous exemplary embodiment of the invention presented here, a sampling of the light signal is disclosed using a regular sampling lattice, as is the realization of this sampling lattice with image sensors or sensor elements in a triangle shape.

Figure 16:
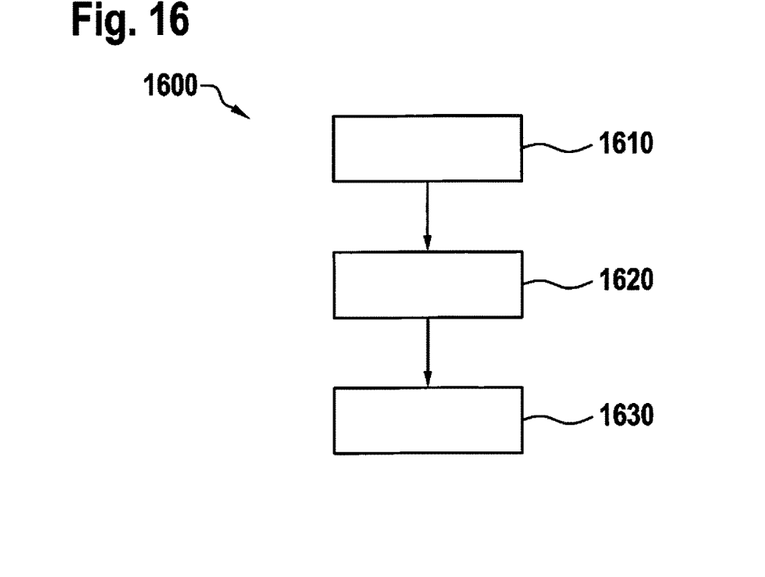
FIG. 16 shows a diagram of a method for sampling an image sensor.

FIG. 16 shows a diagram of a method 1600 for sampling an image sensor, the image sensor having a lattice structure having a plurality of triangular sensor elements, sensor elements configured adjacent to one another in the lattice structure being configured to detect light in a respectively different wavelength range. Method 1600 includes a step 1610 of reading out the image sensor by sampling a plurality of sensor elements of the lattice structure that are configured to detect light in a same first wavelength range, one sensor signal being read out per sensor element in the step of reading out. Method 1600 also includes a step 1620 of buffering the read-out sensor signals. In addition, method 1600 includes a step 1630 of producing an item of information assigned to a point of acquisition of the image sensor, using the buffered sensor signals.

Figure 17:
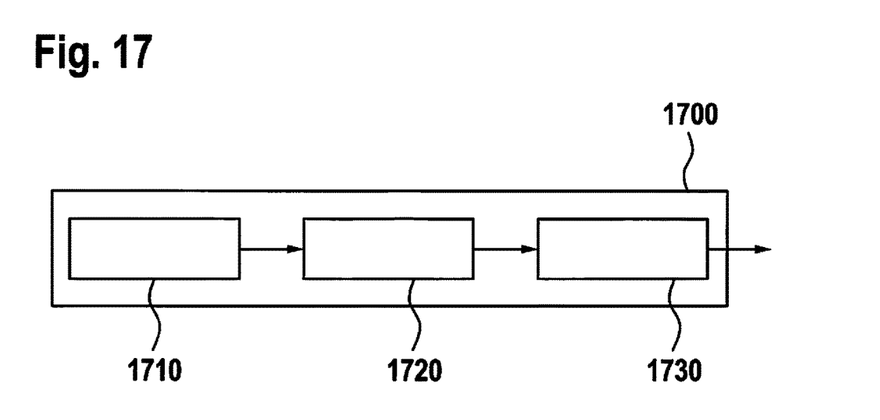
FIG. 17 shows a block diagram of an exemplary embodiment of the present invention as a device for sampling an image sensor.

FIG. 17 shows a schematic diagram of an exemplary embodiment of the present invention as device 1700 for sampling an image sensor, the image sensor having a lattice structure a plurality of triangular sensor elements, the sensor elements being configured adjacent to one another in the lattice structure being configured to detect light in a respectively different wavelength range. The device includes a device 1710 for reading out the image sensor by sampling a plurality of sensor elements of the lattice structure that are configured to detect light in a same first wavelength range, one sensor signal being read out per sensor element in the step of reading out. Device 1700 also includes a unit 1720 for buffering the read-out sensor signals and a unit 1730 for producing an item of image information assigned to a point of acquisition of the image sensor, using the buffered sensor signals.

If an exemplary embodiment has an "and/or" linkage between a first feature and a second feature, this is to be read as meaning that according to a specific embodiment the exemplary embodiment has both the first feature and the second feature, and according to a further specific embodiment the exemplary embodiment has either only the first feature or only the second feature.

What is claimed is:

1. A method for sampling an image sensor, the method comprising:
    reading out the image sensor by sampling a plurality of triangular sensor elements of a lattice structure, the sensor elements being configured adjacent to one another in the lattice structure and being configured to detect light relating to respectively differing light properties and light in a same first wavelength range, one sensor signal being read out per sensor element in the reading out;
    buffering the read-out sensor signals; and
    producing an item of image information assigned to a point of acquisition of the image sensor, using the buffered sensor signals, wherein the point of acquisition is situated inside a region of the image sensor formed by an imaginary connection of those of the triangular sensor elements whose signals are for ascertaining an image content of the point of acquisition.

2. The method of claim 1, wherein in the reading out, at least three sensor elements are sampled, two of three sampled sensor elements being situated on a sensor element straight line and at least one third sensor element not being situated on the sensor element straight line.

3. The method of claim 2, wherein in the reading out, as the sensor element not situated on the sensor element straight line, a sensor element is sampled that is situated at a position in the lattice structure so that at least one sensor element is situated between the position and the sensor element straight line.

4. The method of claim 1, wherein the producing is performed using an interpolation of the buffered sensor signals and/or of signals derived from the buffered sensor signals.

5. The method of claim 1, wherein the reading out, the buffering, and the producing are repeated for sensor elements that are configured to detect light in a same second wavelength range that differs from the first wavelength range.

6. The method of claim 1, wherein the reading out, the buffering, and the producing are carried out multiple times cyclically one after the other, sensor elements being read out, in a first of the cycles, that are situated in the lattice structure on a common first sensor element straight line and at a first position in the lattice structure such that at least one sensor element is situated between the first position and the sensor element straight line, and, in a second cycle, sensor elements being read out that are situated in the lattice structure on a common second sensor element straight line differing from the first sensor element straight line, and at a second position in the lattice structure such that at least one sensor element is situated between the second position and the second sensor element straight line.

7. The method of claim 1, wherein in the buffering there takes place a weighting of one or more of the sensor signals.

8. The method of claim 1, wherein the triangular sensor elements joined via the imaginary connection includes three triangular sensor elements sensitive to white light.

9. The method of claim 8, wherein the region at least partially encompasses a triangular sensor element that is in addition to the three triangular sensor elements sensitive to white light and that is disposed between the acquisition point and one of the three triangular sensor elements sensitive to white light.

10. A device for sampling an image sensor, comprising:
a reading out arrangement to read out the image sensor by sampling a plurality of triangular sensor elements of a lattice structure, the sensor elements being configured adjacent to one another in the lattice structure and being configured to detect light relating to respectively differing light properties and to detect light in a same first wavelength range, one sensor signal being read out per sensor element in the reading out;
a buffering arrangement to buffer the read-out sensor signals; and
a producing arrangement to produce an item of image information assigned to a point of acquisition of the image sensor, using the buffered sensor signals, wherein the point of acquisition is situated inside a region of the image sensor formed by an imaginary connection of those of the triangular sensor elements whose signals are for ascertaining an image content of the point of acquisition.

11. The device of claim 10, wherein the device is integrated in a common semiconductor module.

12. The device of claim 10, wherein the triangular sensor elements joined via the imaginary connection includes three triangular sensor elements sensitive to white light.

13. The device of claim 12, wherein the region at least partially encompasses a triangular sensor element that is in addition to the three triangular sensor elements sensitive to white light and that is disposed between the acquisition point and one of the three triangular sensor elements sensitive to white light.

14. A non-transitory computer readable medium having a computer program, which is executable by a processor, comprising:
a program code arrangement having program code for sampling an image sensor, by performing the following:
reading out the image sensor by sampling a plurality of triangular sensor elements of a lattice structure, the sensor elements being configured adjacent to one another in the lattice structure and being configured to detect light relating to respectively differing light properties, of the image sensor that are configured to detect light in a same first wavelength range, one sensor signal being read out per sensor element in the reading out;
buffering the read-out sensor signals; and
producing an item of image information assigned to a point of acquisition of the image sensor, using the buffered sensor signals, wherein the point of acquisition is situated inside a region of the image sensor formed by an imaginary connection of those of the triangular sensor elements whose signals are for ascertaining an image content of the point of acquisition.

15. The non-transitory computer readable medium of claim 14, wherein in the reading out, at least three sensor elements are sampled, two of three sampled sensor elements being situated on a sensor element straight line and at least one third sensor element not being situated on the sensor element straight line.

16. The non-transitory computer readable medium of claim 14, wherein the triangular sensor elements joined via the imaginary connection includes three triangular sensor elements sensitive to white light.

17. The non-transitory computer readable medium of claim 16, wherein the region at least partially encompasses a triangular sensor element that is in addition to the three triangular sensor elements sensitive to white light and that is disposed between the acquisition point and one of the three triangular sensor elements sensitive to white light.

* * * * *